(12) United States Patent
Bensalem

(10) Patent No.: US 11,162,822 B2
(45) Date of Patent: Nov. 2, 2021

(54) VEHICLE SENSOR COVER DISPLAY

(71) Applicant: TOYOTA MOTOR ENGINEERING & MANUFACTURING NORTH AMERICA, INC., Plano, TX (US)

(72) Inventor: Salem Bensalem, Lansing, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 41 days.

(21) Appl. No.: 16/738,855

(22) Filed: Jan. 9, 2020

(65) Prior Publication Data

US 2021/0215517 A1 Jul. 15, 2021

(51) Int. Cl.
| | |
|---|---|
| *G01D 11/26* | (2006.01) |
| *G01D 11/24* | (2006.01) |
| *G09G 3/20* | (2006.01) |
| *B60R 19/48* | (2006.01) |

(52) U.S. Cl.
CPC ........... *G01D 11/245* (2013.01); *G01D 11/26* (2013.01); *G09G 3/2003* (2013.01); *B60R 19/483* (2013.01)

(58) Field of Classification Search
CPC .... G01D 11/245; G01D 11/26; G09G 3/2003; B60R 19/483
See application file for complete search history.

(56) References Cited

U.S. PATENT DOCUMENTS

| | | | |
|---|---|---|---|
| 5,629,690 A | 5/1997 | Knoll | |
| 7,616,102 B2 | 11/2009 | Kudelko et al. | |
| 7,832,273 B2 | 11/2010 | Schaaf et al. | |
| 2017/0045797 A1* | 2/2017 | Yamamoto | A41D 25/00 |
| 2017/0371032 A1* | 12/2017 | Koelsch | G01S 13/62 |
| 2019/0381860 A1* | 12/2019 | Credo | B60H 1/00785 |
| 2020/0254923 A1* | 8/2020 | Pereyra-Garcia Bustamante | B60B 7/006 |

FOREIGN PATENT DOCUMENTS

| | | |
|---|---|---|
| DE | 102008047282 A1 | 4/2010 |
| EP | 2 068 171 A1 | 6/2009 |

\* cited by examiner

*Primary Examiner* — Jamel E Williams
(74) *Attorney, Agent, or Firm* — Haynes and Boone, LLP

(57) ABSTRACT

Disclosed is a system for controlling the visual appearance of a sensor cover on a vehicle. The system includes a processor, and a sensor cover display disposed on the sensor cover and in communication with the processor. A color-changing element is included in the sensor cover display. The processor is configured to provide a signal representing a desired color or pattern to the color-changing element, and the color-changing element is configured to render the desired color or pattern.

20 Claims, 5 Drawing Sheets

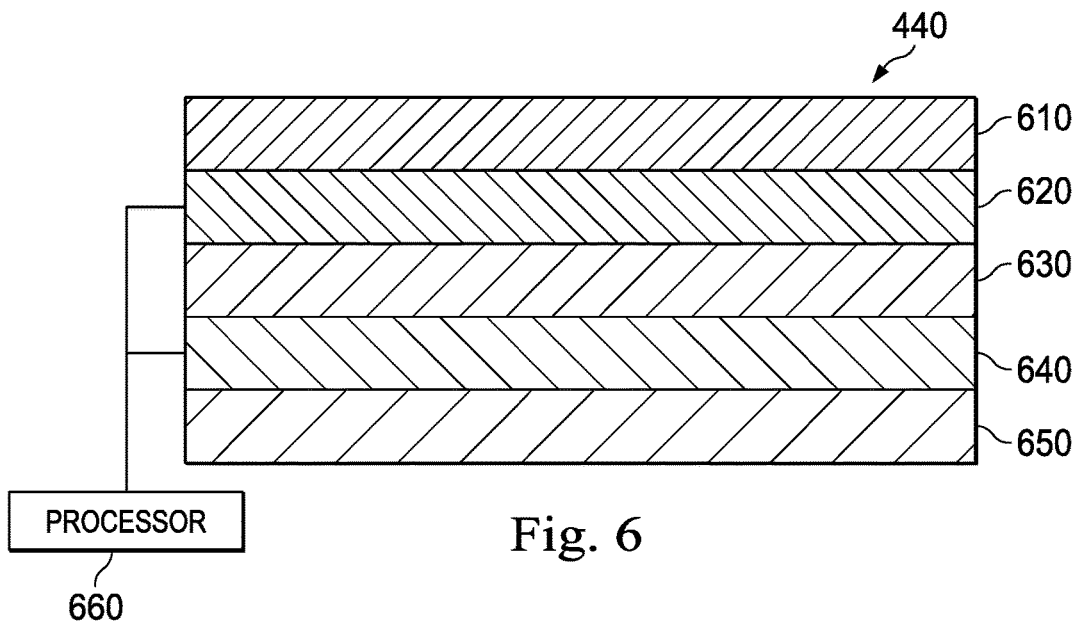
Fig. 6
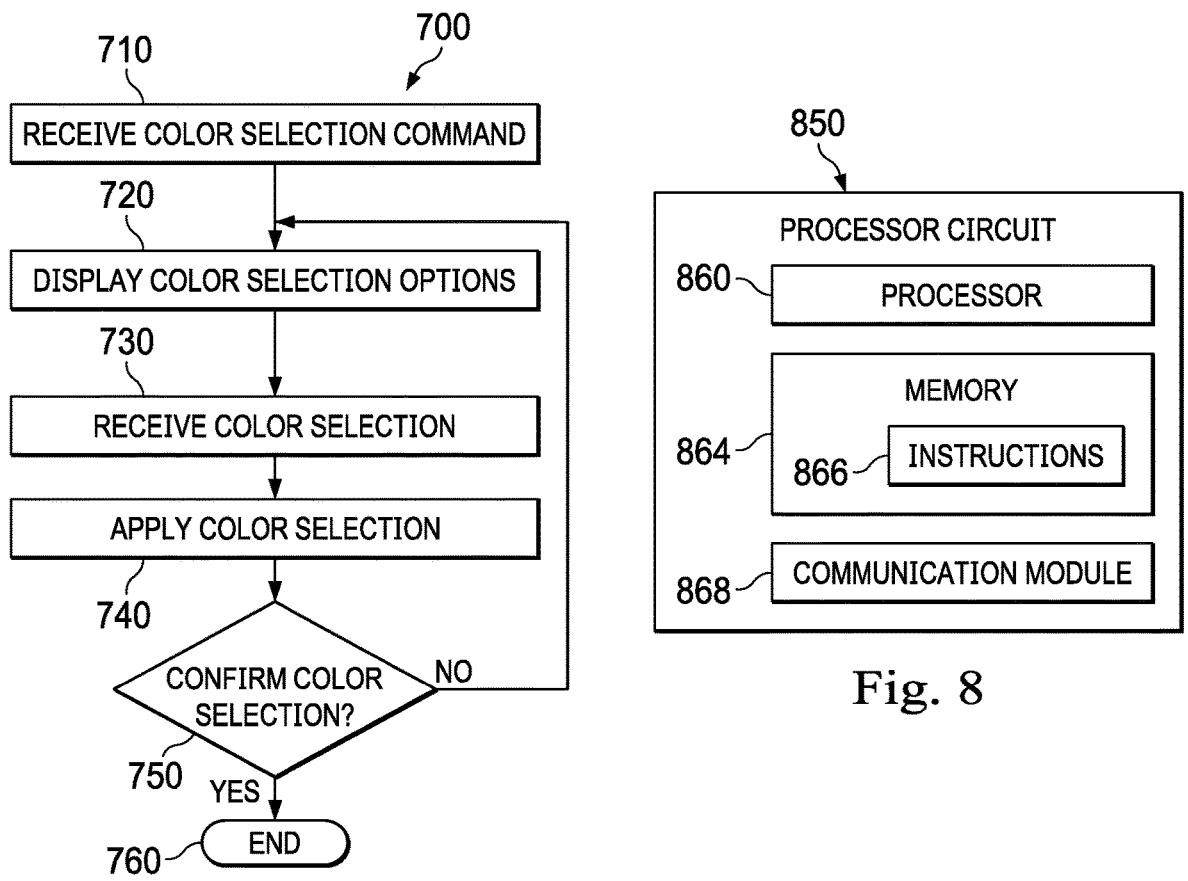
Fig. 7
Fig. 8

VEHICLE SENSOR COVER DISPLAY

TECHNICAL FIELD

The subject matter described herein relates to devices and methods for dynamically selecting the color of vehicle exterior components. This technology has particular but not exclusive utility for color-adjustable vehicle sensor covers.

BACKGROUND

Modern vehicles include an array of different sensors, including radar, LIDAR, proximity sensors, backup sensors, cameras, and other similar sensor types that are externally visible, and that require sensor covers. However, because these covers may be fabricated by different sensor manufacturers, there can be color variation from one sensor manufacturer to another, even within the same vehicle. Coloration of sensor covers may also not match vehicle color or styling. For example, even if a black sensor cover is placed on a black vehicle bumper, the bumper manufacturer and sensor cover manufacturer may employ different shades of black, such that the sensor cover stands out against the bumper rather than blending in. This situation may be even more pronounced when sensors are placed within apertures in a vehicle's painted exterior panel, such as a fender, door, or body panel. In these cases, sensor manufacturers are unlikely to supply sensor covers that closely match the paint or trim colors employed by the vehicle manufacturer. Thus, the sensor is clearly visible, and may detract from the aesthetic appearance of the vehicle.

The information included in this Background section of the specification, including any references cited herein and any description or discussion thereof, is included for technical reference purposes only and is not to be regarded as limiting.

SUMMARY

Disclosed is a programmable sensor cover display that can be instructed to display a desired color, whether based on a vehicle color, vehicle styling, owner preference, or other considerations. Thus, instead of having unwanted color variation between a sensor cover and the bumper or panel in which it is installed, or having multiple manufactured sensor covers in different standardized colors, a sensor cover display is provided that can display a selectable color.

The sensor cover display disclosed herein has particular, but not exclusive, utility for sensor covers used in cars and trucks. The sensor cover display includes One general aspect of the sensor cover display includes a system for controlling the visual appearance of a cover of a sensor on a vehicle. The system includes a processor, a sensor cover display in communication with the processor and disposed on the cover of the sensor, a color-changing element included in the sensor cover display, where the processor is configured to provide a signal representing a desired color or pattern to the color-changing element. The color-changing element is responsive to the signal, and is configured to render the desired color or pattern. Other embodiments of this aspect include corresponding computer systems, apparatus, and computer programs recorded on one or more computer storage devices, each configured to perform the actions of the methods.

Implementations may include one or more of the following features. The system where the desired color is selected to match or complement a color of the vehicle. The system where the desired pattern includes an image, logo, or text. The system where the color-changing element includes a reflective or transflective display. The system where the color-changing element includes a bi-stable display. The system where the signal representing the desired color or pattern is provided by a manufacturer at a time of manufacture or service. The system where the desired color or pattern is selectable via a head unit or portable device. The system where the desired color or pattern is selectable via a remote server. The system where the desired color or pattern is selectable based on an uploaded image. The system where the sensor cover display is transparent or translucent to at least one of radar, lidar, infrared, visible light, or ultrasonic waves. The system further including the cover. The system further including the sensor. The system further including the vehicle. Implementations of the described techniques may include hardware, a method or process, or computer software on a computer-accessible medium.

One general aspect includes a method for controlling visual appearance of a cover of a sensor on a vehicle. The method includes positioning a sensor cover display on the cover of the sensor, where the sensor cover display includes a color-changing element; providing a communication path between a control unit and the sensor cover display; and in response to the sensor cover display receiving a signal of a desired color or pattern from the control unit over the communication path, setting the color or pattern of the color-changing element to the desired color or pattern. Other embodiments of this aspect include corresponding computer systems, apparatus, and computer programs recorded on one or more computer storage devices, each configured to perform the actions of the methods.

Implementations may include one or more of the following features. The method where the desired color matches a color of the vehicle. The method where the desired pattern includes an image, logo, or text. The method where the color-changing element includes a bi-stable reflective or transflective display. The method where the desired color or pattern is set by a manufacturer at a time of manufacture or service. The method where the desired color or pattern is set via a head unit, portable device, or remote server. The method where the desired color or pattern is set based on an uploaded image. Implementations of the described techniques may include hardware, a method or process, or computer software on a computer-accessible medium.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the sensor cover display, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which:

FIG. 6 is a diagrammatic, cross-sectional view of an example sensor cover display in accordance with at least one embodiment of the present disclosure.

FIG. 7 shows a flow diagram of an example sensor cover color control method according to at least one embodiment of the present disclosure.

FIG. 8 is a schematic diagram of a processor circuit, according to embodiments of the present disclosure.

DETAILED DESCRIPTION

Figure 1:
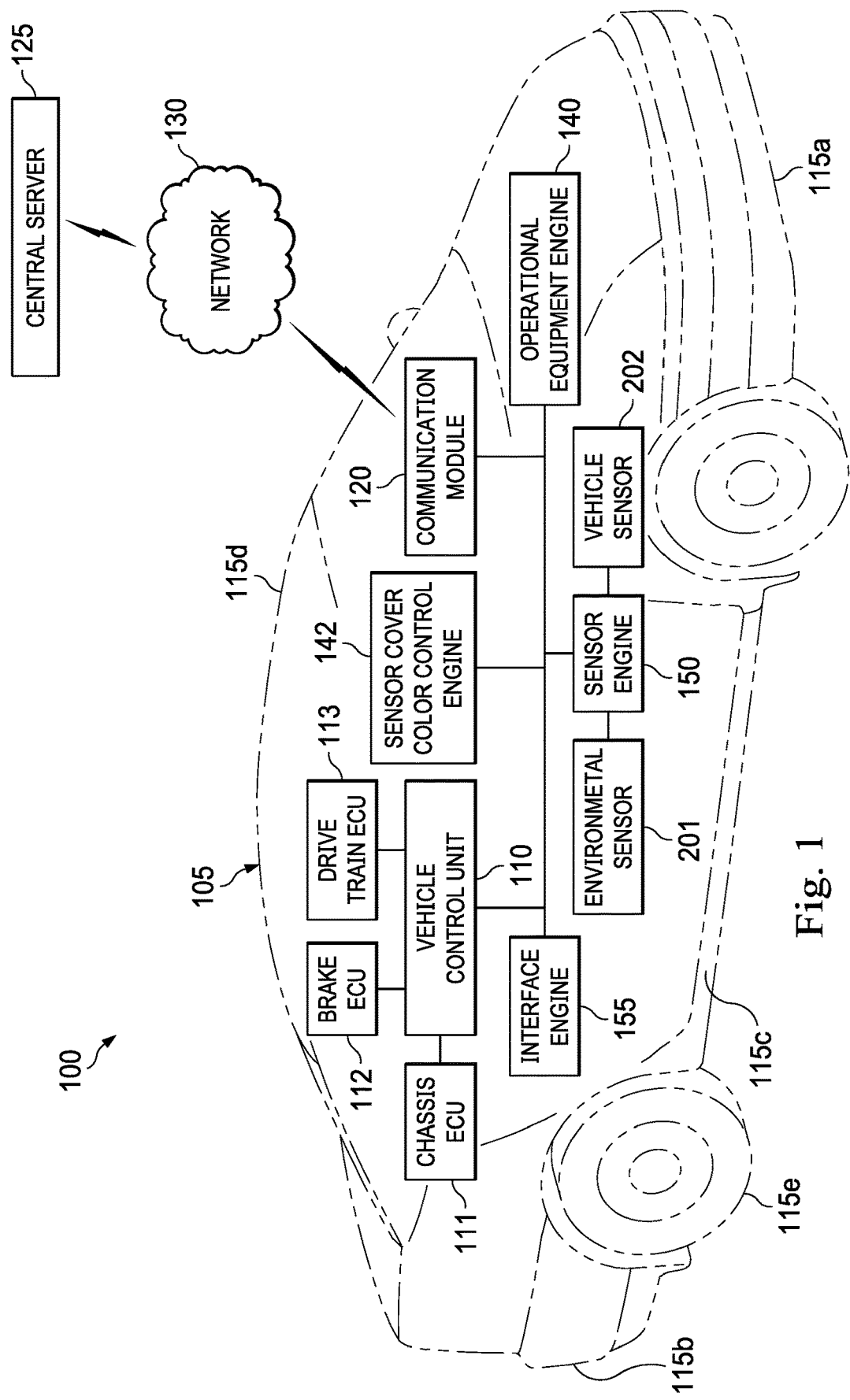
FIG. 1 is a diagrammatic illustration of a vehicle sensor cover display system in accordance with at least one embodiment of the present disclosure.

In accordance with at least one embodiment of the present disclosure, a vehicle sensor cover display is provided that can be instructed to display a desired color, whether based on a vehicle color, vehicle styling, owner preference, or other considerations. Thus, instead of having unwanted color variation between a sensor cover and the bumper or panel in which it is installed, or having multiple manufactured sensor covers in different standardized colors, a sensor cover display is provided that can display a selectable color.

The programmable sensor cover display comprises a colored transmitting layer that allows infrared, RF, ultrasonic waves, etc. to pass through. This colored transmitting layer can have a similar structure to translucent or transparent electronic display panels, including but not limited to TV screens or phone screens. In some cases, the color of this transmitting layer can be set by the vehicle manufacturer at the time of manufacture or service. In other instances, it may be settable by a vehicle owner or other end user. The sensor cover display is capable of displaying a plurality of different colors, for example, on vehicle bumpers, side panels, etc. Having one sensor cover that can display a color to match or complement the body color of a vehicle may potentially reduce vehicle manufacturing costs and production times, while improving the aesthetic and consumer appeal of vehicles.

The present disclosure facilitates the incorporation of external sensors into vehicles, by improving the aesthetic appearance of the sensors. Implemented on a reflective or transflective display in communication with a processor, the sensor cover display disclosed herein provides practical color matching of vehicle sensor covers with other vehicle components. This improved color matching transforms a vehicle sensor cover into a versatile device capable of improving the aesthetic appearance and consumer appeal of a vehicle, without the normally routine need to obtain sensor covers individually matched to vehicle paint or trim colors. This unconventional approach improves the functioning of the vehicle sensor cover, by making it adjustable to different surroundings.

The sensor cover display may be implemented as a programmable or selectable color or pattern that is viewable on a display, and operated by a control process executing on a processor that accepts user inputs from a control panel, joystick, touchscreen interface, or other user interface. In that regard, the control process performs certain specific operations in response to different inputs or selections made at different times, either by the vehicle manufacturer or by a vehicle owner or user. Certain structures, functions, and operations of the processor, display, sensors, and user input systems are known in the art, while others are recited herein to enable novel features or aspects of the present disclosure with particularity.

These descriptions are provided for exemplary purposes only, and should not be considered to limit the scope of the sensor cover display. Certain features may be added, removed, or modified without departing from the spirit of the claimed subject matter.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is a diagrammatic illustration of a vehicle sensor cover display system in accordance with at least one embodiment of the present disclosure. In an example, a vehicle sensor cover display system is referred to by the reference numeral 100 and includes a vehicle 105, such as an automobile, and a vehicle control unit 110 located on the vehicle 105. The vehicle 105 may include a front portion 115*a* (including a front bumper), a rear portion 115*b* (including a rear bumper), a right side portion 115*c* (including a right front quarter panel, a right front door, a right rear door, and a right rear quarter panel), a left side portion 115*d* (including a left front quarter panel, a left front door, a left rear door, and a left rear quarter panel), and wheels 115*e*. A communication module 120 is operably coupled to, and adapted to be in communication with, the vehicle control unit 110. The communication module 120 is adapted to communicate wirelessly with a central server 125 via a network 130 (e.g., a 3G network, a 4G network, a 5G network, a Wi-Fi network, or the like). The central server 125 may provide information and services including but not limited to include location, mapping, route or path, and topography information.

An operational equipment engine 140 is operably coupled to, and adapted to be in communication with, the vehicle control unit 110. A sensor engine 150 is operably coupled to, and adapted to be in communication with, the vehicle control unit 110. The sensor engine 150 is adapted to monitor various components of, for example, the operational equipment engine 140. An interface engine 155 is operably coupled to, and adapted to be in communication with, the vehicle control unit 110. In addition to, or instead of, being operably coupled to, and adapted to be in communication with, the vehicle control unit 110, the communication module 120, the operational equipment engine 140, the sensor engine 150, and/or the interface engine 155 may be operably coupled to, and adapted to be in communication with, another of the components via wired or wireless communication (e.g., via an in-vehicle network). In some examples, the vehicle control unit 110 is adapted to communicate with the communication module 120, the operational equipment engine 140, the sensor engine 150, and the interface engine 155 to at least partially control the interaction of data with and between the various components of the vehicle sensor cover display system 100.

The term "engine" is meant herein to refer to an agent, instrument, or combination of either, or both, agents and instruments that may be associated to serve a purpose or accomplish a task—agents and instruments may include sensors, actuators, switches, relays, power plants, system wiring, computers, components of computers, programmable logic devices, microprocessors, software, software routines, software modules, communication equipment, networks, network services, and/or other elements and their equivalents that contribute to the purpose or task to be accomplished by the engine. Accordingly, some of the engines may be software modules or routines, while others of the engines may be hardware and/or equipment elements in communication with any or all of the vehicle control unit 110, the communication module 120, the network 130, or a central server 125.

In this example, the vehicle 105 also includes a chassis electronic control unit (ECU) 111 which controls elements of the vehicle's suspension system, a brake ECU 112 which controls the braking system or elements thereof, a power train ECU 113 (variously known as an engine ECU, power plant ECU, motor ECU, or transmission ECU) that controls elements of the motor and drivetrain. The system also includes one or more environmental sensors 201, one or more vehicle sensors 202, and a sensor cover color control engine 142, the operation of which will be described below.

A reader of ordinary skill in the art will understand that other components or arrangements of components may be found in a vehicle 105, and that the same general principles apply to electric vehicles, internal combustion vehicles, and hybrid vehicles. For example, a power train ECU 113 may control both motor and transmission components. Alternatively, a separate motor ECU and transmission ECU may exist, or some functions of a motor ECU or transmission ECU may be performed by the VCU 110.

Before continuing, it should be noted that the examples described above are provided for purposes of illustration, and are not intended to be limiting. Other devices and/or device configurations may be utilized to carry out the operations described herein.

Figure 2:
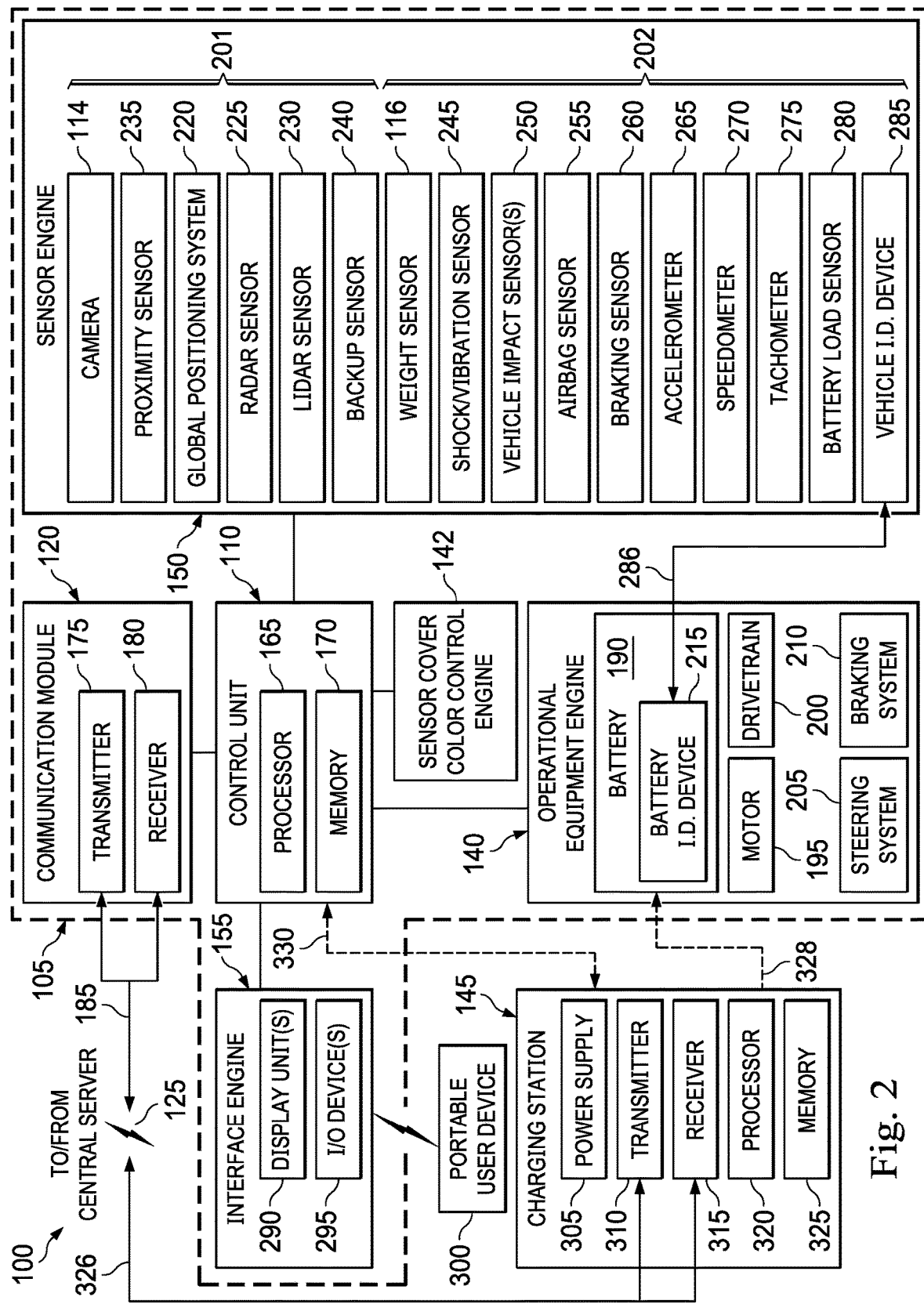
FIG. 2 is a diagrammatic illustration, in a block-diagram form, of at least a portion of the sensor cover display system of FIG. 1, in accordance with at least one embodiment of the present disclosure.

FIG. 2 is a diagrammatic illustration, in a block-diagram form, of at least a portion of the sensor cover display system 100 of FIG. 1, in accordance with at least one embodiment of the present disclosure. It is worth noting that the components of the vehicle 105 may be located either permanently or temporarily as a part of the vehicle 105. The vehicle control unit (VCU) 110 includes a processor 165 and a memory 170. In some examples, the communication module 120, which is operably coupled to, and adapted to be in communication with, the vehicle control unit 110, includes a transmitter 175 and a receiver 180. In some examples, one or the other of the transmitter 175 and the receiver 180 may be omitted according to the particular application for which the communication module 120 is to be used. In other examples, the transmitter 175 and receiver 180 are combined into a single transceiver that performs both transmitting and receiving functions.

In some examples, the operational equipment engine 140, which is operably coupled to, and adapted to be in communication with, the vehicle control unit 110, includes a plurality of devices configured to facilitate driving of the vehicle 105. In this regard, the operational equipment engine 140 may be designed to exchange communication with the vehicle control unit 110, so as to not only receive instructions, but to provide information on the operation of the operational equipment engine 140. For example, the operational equipment engine 140 may include a vehicle battery 190, a motor 195, a drivetrain 200, a steering system 205, and a braking system 210. In some vehicles, the vehicle battery 190 may provide electrical power to the motor 195 to drive the wheels 115e of the vehicle 105 via the drivetrain 200. In some examples, instead of or in addition to providing power to the motor 195 to drive the wheels 115e of the vehicle 105 via the drivetrain or transmission 200, the vehicle battery 190 provides electrical power to another component of the operational equipment engine 140, the vehicle control unit 110, the communication module 120, the sensor engine 150, the interface engine 155, or any combination thereof. In some examples, the vehicle battery 190 includes a battery identification device 215. In some embodiments, the motor is an internal combustion motor and the battery operates a starter.

In some examples, the sensor engine 150, which is operably coupled to, and adapted to be in communication with, the vehicle control unit 110, includes devices such as sensors, meters, detectors, or other devices configured to measure or sense a parameter related to a driving operation of the vehicle 105. For example, the sensor engine 150 may include a global positioning system 220, a radar sensor 225, a LIDAR sensor 230, a proximity sensor 235, a backup sensor 240, a shock/vibration sensor 245, a vehicle impact sensor 250, an airbag sensor 255, a braking sensor 260, an accelerometer 265, a speedometer 270, a tachometer 275, a battery load sensor 280, a vehicle identification device 285, a camera 114, a weight sensor 116, or any combinations thereof. Each of these sensors may include one or more sensor covers as shown for example in FIG. 4. The sensors or other detection devices may be configured to sense or detect activity, conditions, and circumstances in an area to which the device has access, e.g., ambient conditions. Subcomponents of the sensor engine 150 may be deployed at any operational area where information on the driving of the vehicle 105 may occur. Readings from the sensor engine 150 are fed back to the vehicle control unit 110. Stored and reported performance data may include the sensed data, or may be derived, calculated, or inferred from sensed data. The vehicle control unit 110 may send signals to the sensor engine 150 to adjust the calibration or operating parameters of the sensor engine 150 in accordance with a control program in the vehicle control unit 110. The vehicle control unit 110 is adapted to receive and process performance data from the sensor engine 150 or from other suitable source(s), and to monitor, store (e.g., in the memory 170), and/or otherwise process (e.g., using the processor 165) the received performance data.

The braking sensor 260 is adapted to monitor usage of the vehicle 105's braking system 210 (e.g., an antilock braking system 210) and to communicate the braking information to the vehicle control unit 110. The accelerometer 265 is adapted to monitor acceleration of the vehicle 105 and to communicate the acceleration information to the vehicle control unit 110. The accelerometer 265 may be, for example, a two-axis accelerometer 265 or a three-axis accelerometer 265. In some examples, the accelerometer 265 is associated with an airbag of the vehicle 105 to trigger deployment of the airbag. The speedometer 270 is adapted to monitor speed of the vehicle 105 and to communicate the speed information to the vehicle control unit 110. In some examples, the speedometer 270 is associated with a display unit of the vehicle 105 such as, for example, a display unit of the interface engine 155, to provide a visual indication of vehicle speed to a driver of the vehicle 105. The tachometer 275 is adapted to monitor the working speed (e.g., in revolutions-per-minute) of the vehicle 105's motor 195 and to communicate the angular velocity information to the vehicle control unit 110. In some examples, the tachometer 275 is associated with a display unit of the vehicle 105 such as, for example, a display unit of the interface engine 155, to provide a visual indication of the motor 195's working speed to the driver of the vehicle 105. The battery load sensor 280 is adapted to monitor charging, discharging, and/or overcharging of the vehicle battery 190 and to communicate the charging, discharging, and/or overcharging information to the vehicle control unit 110.

In some examples, the vehicle identification device 285 stores data identifying the vehicle 105 such as, for example, manufacturing information (e.g., make, model, production date, production facility, etc.), vehicle characteristic(s) information, vehicle identification number ("VIN") information, battery compatibility information, or the like. The vehicle identification device 285 is adapted to communicate with the battery identification device 215 (or vice versa), as indicated by arrow 286. In some examples, the vehicle identification device 285 and the battery identification device 215 may each communicate with the vehicle control unit 110.

In some examples, the interface engine 155, which is operably coupled to, and adapted to be in communication with, the vehicle control unit 110, includes at least one input and output device or system that enables a user to interact with the vehicle control unit 110 and the functions that the vehicle control unit 110 provides. For example, the interface engine 155 may include a display unit 290 and an input/output ("I/O") device 295. The display unit 290 may be, include, or be part of multiple display units. In some examples, the display unit 290 may include one, or any combination, of a central display unit associated with a dash of the vehicle 105, an instrument cluster display unit associated with an instrument cluster of the vehicle 105, and/or a heads-up display unit associated with the dash and a windshield of the vehicle 105; accordingly, as used herein the reference numeral 290 may refer to one, or any combination, of the display units. The I/O device 295 may be, include, or be part of a communication port (e.g., a USB port), a Bluetooth communication interface, a tough-screen display unit, soft keys associated with a dash, a steering wheel, or another component of the vehicle 105, and/or similar components. Other examples of sub-components that may be part of the interface engine 155 include, but are not limited to, audible alarms, visual alerts, telecommunications equipment, and computer-related components, peripherals, and systems.

In some examples, a portable user device 300 belonging to an occupant of the vehicle 105 may be coupled to, and adapted to be in communication with, the interface engine 155. For example, the portable user device 300 may be coupled to, and adapted to be in communication with, the interface engine 155 via the I/O device 295 (e.g., the USB port and/or the Bluetooth communication interface). In an example, the portable user device 300 is a handheld or otherwise portable device (e.g., a smartphone or tablet computer) which is carried onto the vehicle 105 by a user who is a driver or a passenger on the vehicle 105, or proximate to the vehicle. In addition, or instead, the portable user device 300 may be removably connectable to the vehicle 105, such as by temporarily attaching the portable user device 300 to the dash, a center console, a seatback, or another surface in the vehicle 105. In another example, the portable user device 300 may be permanently installed in the vehicle 105. In some examples, the portable user device 300 is, includes, or is part of one or more computing devices such as personal computers, personal digital assistants, cellular devices, mobile telephones, wireless devices, handheld devices, laptops, audio devices, tablet computers, game consoles, cameras, and/or any other suitable devices. In several examples, the portable user device 300 is a smartphone such as, for example, an iPhone® by Apple Incorporated.

The vehicle sensor cover display system 100 also includes a sensor cover color control engine 142, the operation of which will be described below. In some embodiments, the sensor cover color control engine 142 comprises a stand-alone housing with its own processor and memory. In other embodiments, the sensor cover color control engine 142 exists as software, firmware, or hardware within another processor, such as the vehicle control unit 110, operational equipment engine 140, or power train ECU 113. The sensor engine 150 includes environmental sensors 201 and vehicle sensors 202.

A reader of ordinary skill in the art will understand that other components or arrangements of components may be found in a vehicle 105, and that the same general principles apply to electric vehicles, internal combustion vehicles, and hybrid vehicles.

Figure 3:
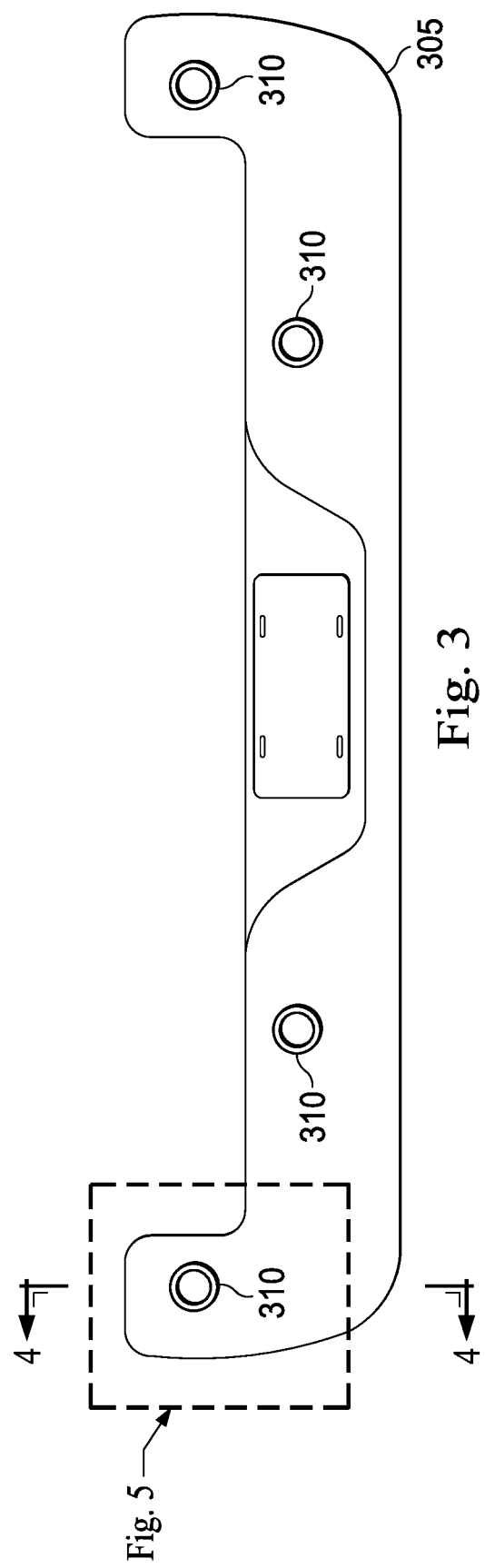
FIG. 3 is a diagrammatic rear view of an example vehicle rear bumper that includes a plurality of sensor locations in accordance with at least one embodiment of the present disclosure.

FIG. 3 is a diagrammatic rear view of an example vehicle rear bumper 305 that includes a plurality of sensor locations 310 in accordance with at least one embodiment of the present disclosure. The sensor locations 310 may be openings or apertures in the bumper 305. In an example, sensors (such as the sensors 201, 225, 230, 235, 240, or 114 from FIG. 2) may be positioned behind the bumper such that they "see" through the openings of the sensor locations 310. In other embodiments, sensor locations 310 may be different than what is shown in this example. For example, sensor locations 310 may occur in a front bumper, or in fenders, door panels, body panels, or other locations on the vehicle.

Figure 4:
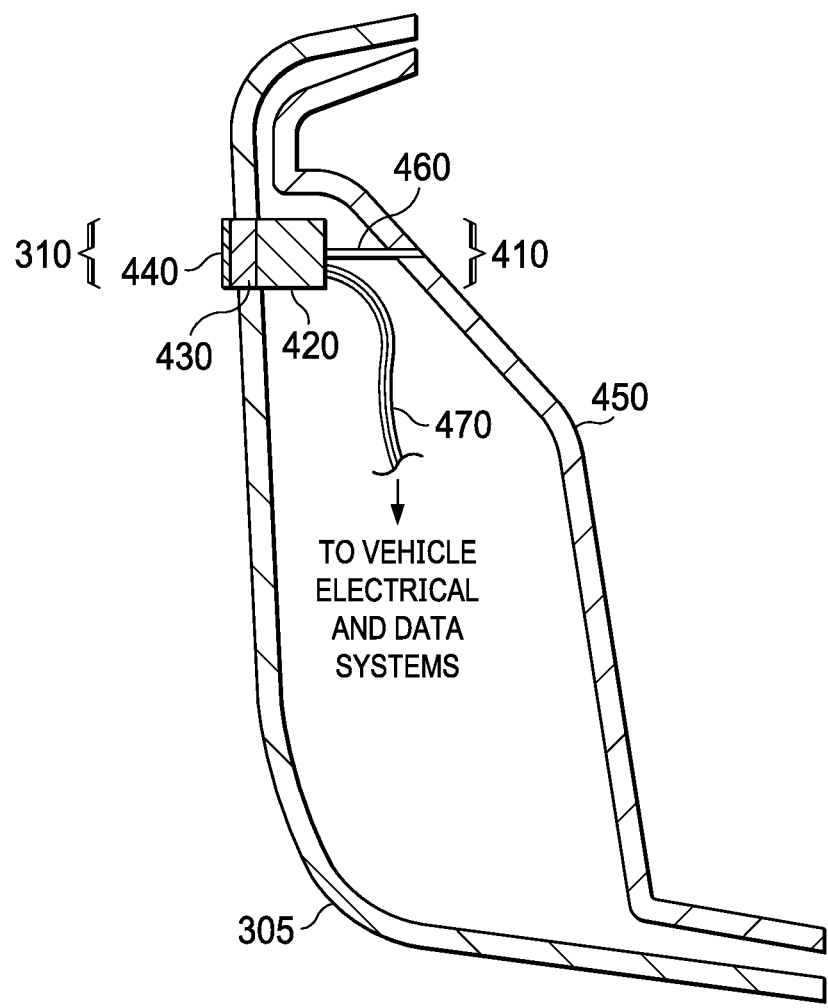
FIG. 4 is a diagrammatic cross-sectional side view of an example vehicle rear bumper that includes a sensor location populated by a sensor in accordance with at least one embodiment of the present disclosure.

FIG. 4 is a diagrammatic cross-sectional side view of an example vehicle rear bumper 305 that includes a sensor location 310 populated by a sensor 410, in accordance with at least one embodiment of the present disclosure. This view has been cross sectioned along a plane represented by line A-A in FIG. 3. The sensor 410 may for example be a sensor 201, 225, 230, 235, 240, or 114 as shown in FIG. 2, or may be another type of sensor configured to "see" outward through the sensor location 310. The sensor 410 comprises a sensor housing 420 and sensor cover 430. Also visible is a supporting member 450 to which, for example, the bumper 305 or other vehicle components may be attached. In an example, the supporting member 450 may be a bracket or panel, or a portion of the vehicle frame.

In some embodiments, the sensor housing 420 may be coupled to the vehicle bumper (or other vehicle exterior component) 305. In other embodiments, an attachment member 460 may couple the sensor housing 420 to the supporting member 450. The attachment member 460 may comprise one or more bolts, screws, pins, clips, clamps, or similar attachment components. In the example shown in FIG. 4, one or more conductors 470 carry electrical power and/or data signals between the sensor 410 and the vehicle electrical and data system. Connection may for example be to the vehicle control unit 110, communication module 120, sensor cover color control engine 142, sensor engine 150, or battery 190 as shown for example in FIGS. 1 and 2, or to other vehicle components whether or not shown, listed, or described herein. In some embodiments, the sensor cover display 440 receives power and communication through the sensor housing 420. In other embodiments, the sensor cover display 440 has its own independent connections to vehicle electrical and data systems.

Figure 5:
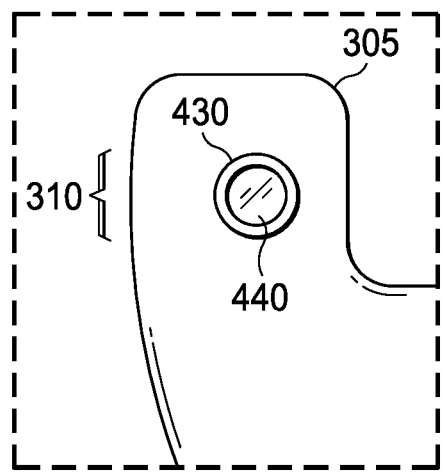
FIG. 5 is a diagrammatic closeup rear view of an example rear bumper comprising a sensor cover display in accordance with at least one embodiment of the present disclosure.

FIG. 5 is a diagrammatic closeup rear view of an example rear bumper 305 comprising a sensor cover display 440, in accordance with at least one embodiment of the present disclosure. A sensor location 310 within the bumper 305 (or other vehicle location) is populated by a sensor (not shown) that comprises a sensor cover 430 which includes the sensor cover display 440. The sensor cover display 440 can be used to change the apparent color of the sensor cover 430. This can be done for example to match the color of the sensor cover 430 to the color of the bumper 305.

In an example, color mismatches between a sensor cover 430 and the surrounding bumper 305 (or other vehicle exterior component such as a fender, door, hood, or body panel) may create an aesthetic issue with the appearance of the vehicle. Conversely, a sensor cover 430 that comprises a sensor cover display 440 may be capable of assuming any of a plurality of different colors or patterns. The displayed color of the sensor cover display 440 may be selected to match or complement the color of the bumper 305 (or other vehicle exterior component such as a fender, door, hood, or body panel), or may be selected for other reasons including but not limited to visibility, concealment, aesthetics, communication, advertising, or to aid or inhibit the functioning of the sensor 410.

FIG. 6 is a diagrammatic, cross-sectional view of an example sensor cover display 440 in accordance with at least one embodiment of the present disclosure. The sensor cover display 440 may be a reflective or transflective video display that shows a color or pattern by reflecting light from an external source, including natural daylight as well as artificial light sources such as headlights, streetlights, and building lights. In this example, the sensor cover display 440 comprises multiple layers, including a substrate layer 650, a bottom electrode layer 640, a color changing layer 630, a control layer 620, and a protective layer 610. In an example the substrate layer may be an insulating material such as $SiO^2$, sapphire, or plastic, or a semiconductor material such as silicon. In an example, the bottom electrode 640 may be a conductive material such as a metal or conductive polymer, or may be a semiconductor material. In an example, the color-changing layer may be a liquid crystal material sandwiched between two crossed polarizers, or may be a guest-host (e.g., dichroic dye doped) liquid crystal material, electrochromic material, e-paper or e-ink display layer, electrophoretic display layer, or other electrically influenced color-changing material or arrangement of materials. In an example, the control layer comprises a plurality of pixels fashioned from a transparent conductive or semiconductive material such as indium tin oxide (ITO). In an example the protective layer is a transparent protective material such as an oxide (e.g., $SiO^2$, sapphire, etc.), polymer (e.g., acrylic, polycarbonate, etc.), or other transparent material.

In the example shown in FIG. 6, the control layer 620 and bottom electrode 640 are electrically coupled to, and controlled by, a processor 660. The processor 660 may be the Vehicle Control Unit 110 or sensor cover color control engine 142 of FIGS. 1 and 2, or may be another processor. When the control layer 620 is activated by the processor 660 such that at least a portion of it (e.g., at least one pixel) experiences a voltage difference with respect to the bottom electrode 640 of greater than a threshold amount, the color-changing layer changes color in a controlled and corresponding manner. Depending on the implementation, including factors such as resolution, contrast, color depth, etc., the sensor cover display 440 may be capable of displaying a limited number of solid colors, a large plurality of solid colors, or else complex multicolored patterns that may, for example, mimic complex paint effects, logos, alphanumeric characters, or other designs.

Other types of displays may be employed than what is shown in FIG. 6. In some embodiments, the sensor cover display 440 may be transparent or translucent to sound waves, light waves, radar waves, or other energy used by the sensor that is covered by the sensor cover display 440. In some embodiments, the sensor cover display 440 may reproduce color from a digital photograph, or may display a color selected from a menu of colors (e.g., paint and trim colors) or patterns commonly employed by the vehicle manufacturer.

In some embodiments, the sensor cover display 440 is a reflective or transflective display, that shows a reflective or transflective color, e.g., a color that is seen by reflecting ambient light, rather than by the generation of light, emission of light, or transmission of light generated behind the sensor cover display 440. In some embodiments, the sensor cover display 440 is an active display that requires constant power to display a color or pattern. In other embodiments, the sensor cover display is a bi-stable display that requires power only to change the color or pattern being displayed, but can otherwise stably display a color or pattern for substantial periods of time (e.g., months or years) without the application of electrical power or signals. The bi-stable display may for example be an e-ink, e-paper, or electrophoretic display, or other bi-stable display. In an example the various layers of the sensor cover display are transparent or translucent to at least one of radar, lidar, infrared, visible light, or, ultrasonic waves.

The color or pattern displayed by the sensor cover display 440 may be selected at the time of manufacture, or may be changed one or more times by a vehicle owner or other user. In some embodiments, the color selection may be through a vehicle dashboard or head unit (e.g., display unit 290 or I/O device 295 of FIG. 2), through a portable device (e.g., portable device 300 of FIG. 2), through a remote server, or by another device. The color or pattern selection may involve a color wheel, color chart, a series of menus or sliders, or other means of selecting a hue, brightness, saturation, and other desired color parameters. In other cases, the sensor cover display 440 may also be configured to display visual patterns or visual textures to reproduce the appearance of other vehicle surfaces. In some embodiments, reflective polarizers or other means may be employed to enable a switchable mirror that is capable of mimicking chrome finishes as a possible color option. In some embodiments, the sensor cover display 440 may be used to display logos or other images. The logos and images may be provided via an upload.

Depending on the implementation, the processor 660 may be the Vehicle Control Unit 110 or sensor cover control engine 142 of FIGS. 1 and 2, or may be another processor. The processor 660 may comprise any combination of general-purpose computing devices, reduced instruction set computing (RISC) devices, application-specific integrated circuits (ASICs), field programmable gate arrays (FPGAs), or other related logic devices.

FIG. 7 shows a flow diagram of an example sensor cover color control method 700 according to at least one embodiment of the present disclosure. It is understood that the steps of method 700 may be performed in a different order than shown in FIG. 7, additional steps can be provided before, during, and after the steps, and/or some of the steps described can be replaced or eliminated in other embodiments. One or more of steps of the method 700 can be carried by one or more devices and/or systems described herein, such as the VCU 110 or sensor cover color control engine 142 of FIGS. 1 and 2, and/or processor circuit 850 of FIG. 8.

In step 710, the method 700 includes receiving a color selection command from a user, indicating that the user wishes to select a color for the sensor cover display. This command may for example be selected by the user as a menu option on a portable device, vehicle head unit, or other touchscreen or control panel.

In step 720, the method 700 includes displaying color selection options to the user via the portable device, vehicle head unit, or other touchscreen or control panel. As described above, this may involve the display of an interactive color wheel, color chart, series of menus or sliders, or other means of selecting a hue, brightness, saturation, and other desired color parameters. In some cases, the user may be able to select a color or pattern from a list of available colors or patterns, or may upload a color or pattern from a portable device (e.g., as a digital photograph), or may download a color or pattern from a remote server (e.g., a database of popular or factory-recommended colors and patterns).

In step 730, the method 700 includes receiving the color selection from the user.

In step 740, the method 700 includes applying the color selection to the sensor cover display. This may be done for example by commanding individual pixels within the control layer 620 (as shown for example in FIG. 6) to assume particular voltages, that induce particular color changes within localized portions of the color changing layer 630 (as shown for example in FIG. 6).

In step 750, the method 700 includes confirming the color selection with the user. For example, the method may display an interactive confirmation message to the user via the portable device, vehicle head unit, or other touchscreen or control panel. If the user does not confirm, then the method returns to step 720. If the user does confirm, then the method proceeds to step 760 and is complete.

FIG. 8 is a schematic diagram of a processor circuit 850, according to embodiments of the present disclosure. The processor circuit 850 may be implemented in the vehicle sensor cover display system 100, or other devices or workstations (e.g., third-party workstations, network routers, etc.), or on a cloud processor or other remote processing unit, as necessary to implement the method. As shown, the processor circuit 850 may include a processor 860, a memory 864, and a communication module 868. These elements may be in direct or indirect communication with each other, for example via one or more buses.

The processor 860 may include a central processing unit (CPU), a digital signal processor (DSP), an ASIC, a controller, or any combination of general-purpose computing devices, reduced instruction set computing (RISC) devices, application-specific integrated circuits (ASICs), field programmable gate arrays (FPGAs), or other related logic devices, including mechanical and quantum computers. The processor 860 may also comprise another hardware device, a firmware device, or any combination thereof configured to perform the operations described herein. The processor 860 may also be implemented as a combination of computing devices, e.g., a combination of a DSP and a microprocessor, a plurality of microprocessors, one or more microprocessors in conjunction with a DSP core, or any other such configuration.

The memory 864 may include a cache memory (e.g., a cache memory of the processor 860), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 864 includes a non-transitory computer-readable medium. The memory 864 may store instructions 866. The instructions 866 may include instructions that, when executed by the processor 860, cause the processor 860 to perform the operations described herein. Instructions 866 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The communication module 868 can include any electronic circuitry and/or logic circuitry to facilitate direct or indirect communication of data between the processor circuit 850, and other processors or devices. In that regard, the communication module 868 can be an input/output (I/O) device. In some instances, the communication module 868 facilitates direct or indirect communication between various elements of the processor circuit 850 and/or the vehicle sensor cover display system 100. The communication module 1068 may communicate within the processor circuit 1050 through numerous methods or protocols. Serial communication protocols may include but are not limited to US SPI, I²C, RS-232, RS-485, CAN, Ethernet, ARINC 429, MODBUS, MIL-STD-1553, or any other suitable method or protocol. Parallel protocols include but are not limited to ISA, ATA, SCSI, PCI, IEEE-488, IEEE-1284, and other suitable protocols. Where appropriate, serial and parallel communications may be bridged by a UART, USART, or other appropriate subsystem.

External communication (including but not limited to software updates, firmware updates, preset sharing between the processor and central server, or readings from the ultrasound device) may be accomplished using any suitable wireless or wired communication technology, such as a cable interface such as a USB, micro USB, Lightning, or FireWire interface, Bluetooth, Wi-Fi, ZigBee, Li-Fi, or cellular data connections such as 2G/GSM, 3G/UMTS, 4G/LTE/WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information. Information may also be transferred on physical media such as a USB flash drive or memory stick.

As will be readily appreciated by those having ordinary skill in the art after becoming familiar with the teachings herein, the sensor cover display advantageously permits a sensor cover to be dynamically recolored or repatterned in order to match or complement the colors of a vehicle, or for other aesthetic purposes. Depending on the implementation, a number of variations are possible on the examples and embodiments described above. For example, different types of display technology may be employed. The sensor cover display may include an internal light source. Sensors may be incorporated into multi-colored vehicle exterior components, and may for example be placed along a color seam, which the sensor cover display may be able to mimic. The technology described herein may be applied to different cover types, including but not limited to vent covers, filter covers, fuel cap covers, or valve covers, or may be applied to different vehicle types, including on-road and off-road vehicles, watercraft, and aircraft.

The logical operations making up the embodiments of the technology described herein are referred to variously as operations, steps, objects, elements, components, layers, or modules. It should be understood that these may occur or be performed or arranged in any order, unless explicitly claimed otherwise or a specific order is inherently necessitated by the claim language. All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the sensor cover display. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide a complete description of the structure and use of exemplary embodiments of the sensor cover display as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A system for controlling visual appearance of a cover of a sensor for a vehicle, comprising:
    a processor;
    a sensor cover display in communication with the processor and disposed on the cover of the sensor; and
    a color-changing element included in the sensor cover display,
    wherein the processor is configured to provide a signal representing a desired color or pattern to the color-changing element,
    wherein the color-changing element, responsive to the signal, is configured to render the desired color or pattern,
    wherein the sensor cover display is transparent or translucent to energy used b the sensor.

2. The system of claim 1, wherein the desired color is selected to match or complement a color of the vehicle.

3. The system of claim 1, wherein the desired pattern comprises an image, logo, or text.

4. The system of claim 1, wherein the color-changing element comprises a reflective or transflective display.

5. The system of claim 1, wherein the color-changing element comprises a bi-stable display.

6. The system of claim 1, wherein the signal representing the desired color or pattern is provided by a manufacturer at a time of manufacture or service.

7. The system of claim 1, wherein the desired color or pattern is selectable via a head unit or portable device.

8. The system of claim 1, wherein the desired color or pattern is selectable via a remote server.

9. The system of claim 1, wherein the desired color or pattern is selectable based on an uploaded image.

10. The system of claim 1, wherein the sensor cover display is transparent or translucent to at least one of radar, lidar, infrared, visible light, or ultrasonic waves.

11. The system of claim 1, further comprising the cover.

12. The system of claim 11, further comprising the sensor.

13. The system of claim 12, further comprising the vehicle.

14. A method for controlling visual appearance of a cover of a sensor for a vehicle, comprising:
    positioning a sensor cover display on the cover of the sensor, wherein the sensor cover display comprises a color-changing, element;
    providing a communication path between a control unit and the sensor cover display; and
    in response to the sensor cover display receiving a signal of a desired color or pattern from the control unit over the communication path, setting a color or pattern of the color-changing element to the desired color or pattern,
    wherein the sensor cover display is transparent or translucent to energy used by the sensor.

15. The method of claim 14, herein the desired color matches a color of the vehicle.

16. The method of claim 14, wherein the desired pattern comprises an image, logo, or text.

17. The method of claim 14, wherein the color-changing element comprises a bi-stable reflective or transflective display.

18. The method of claim 14, wherein the desired color or pattern is set by a manufacturer at a time of manufacture or service.

19. The method of claim 14, wherein the desired color or pattern is set via a head unit, portable device, or remote server.

20. The method of claim 14, wherein the desired color or pattern is set based on an uploaded image.

* * * * *